United States Patent [19]

Loyd, Jr.

[11] 4,187,825

[45] Feb. 12, 1980

[54] PILOT FUEL IGNITED STRATIFIED CHARGE ROTARY COMBUSTION ENGINE AND FUEL INJECTOR THEREFOR

[75] Inventor: Robert W. Loyd, Jr., Wyckoff, N.J.

[73] Assignee: Curtiss-Wright Corporation, Wood-Ridge, N.J.

[21] Appl. No.: 966,074

[22] Filed: Dec. 4, 1978

Related U.S. Application Data

[62] Division of Ser. No. 842,472, Oct. 17, 1977, abandoned.

[51] Int. Cl.² ............................................. F02B 53/10
[52] U.S. Cl. .................................. 123/205; 123/32 G; 239/453
[58] Field of Search ...................... 123/32 G, 205, 206; 239/438, 452, 453, 533.3, 533.9, 574

[56] References Cited

U.S. PATENT DOCUMENTS 3,446,440  5/1969  Pelz et al. .............................. 239/453
3,894,518  7/1975  Gavrun et al. ......................... 123/206

Primary Examiner—Michael Koczo

[57] ABSTRACT

For a pilot fuel ignited stratified charge rotary, internal combustion engine, the fuel injection system and a fuel injector therefor comprises a fuel injector having plural discharge ports with at least one of the discharge ports located to emit a "pilot" fuel charge (relatively rich fuel-air mixture) into a passage in the engine housing, which passage communicates with the engine combustion chambers. An ignition element is located in the passage to ignite the "pilot" fuel (a relatively rich fuel-air mixture) flowing through the passage. At least one other discharge port of the fuel injector is in substantially direct communication with the combustion chambers of the engine to emit a main fuel charge into the latter. The ignited "pilot" fuel-air mixture, when ignited, flashes into the combustion chambers to ignite the main, relatively lean, fuel-air mixture which is in the combustion chambers.

7 Claims, 4 Drawing Figures

PILOT FUEL IGNITED STRATIFIED CHARGE ROTARY COMBUSTION ENGINE AND FUEL INJECTOR THEREFOR

This is a divisional application of applicant's pending patent application, Ser. No.842,472, filed Oct. 17, 1977, and now abandoned.

This invention relates to rotary combustion engines and more particularly to stratified charge internal combustion engines of the Wankel type disclosed in the U.S. Pat. to Wankel et al, No. 2,988,065, dated June 13, 1961 and to Bentele et al, U.S. Pat. No. 3,007,460 dated Nov. 7, 1961.

It has become generally well known that in Wankel-type internal combustion engines fuel burning efficiency can be increased and objectionable exhaust emissions decreased by stratified charge operation of the engine. By stratified charge operation is meant that the fuel-air mixture or charge in engine combustion chambers is not of a uniform mixture and instead has at least one region where the fuel-air mixture is rich. Combustion is initiated in this relatively rich fuel-air mixture, the combustion of which affects ignition of the relatively lean fuel-air mixture. A stratified charge engine compared with an engine operating at approximately a stoichiometric fuel-air ratio functions on a leaner overall fuel-air ratio and, therefore, results in a significant reduction in both the oxides of nitrogen ($NO_x$) and carbon monoxide in the exhaust as well as a reduction in hydrocarbons and fuel consumption.

In many stratified charge-type Wankel engines, stratification has been achieved by timed injection of fuel at high pressure through injectors. It has been found for consistent light-off of the main fuel charge to utilize a pilot flame and, to this end, it is common to employ an injector to discharge fuel into a combustion chamber adjacent a spark plug to be ignited and introduce the main fuel charge via one or more other injectors or by way of a carburetor. These well known engines are exemplified in the following U.S. Pat. Nos.: 3,894,518 Gavrun et al July 15, 1975, 3,923,012 Jones et al Dec. 2, 1975, 3,987,759 Roberts et al Oct. 26, 1976, 4,029,058 Jones June 14, 1977.

These stratified charge-type fuel systems comprising two or more injectors, with each connected to a separate jerk pump, are expensive because of the use of plural fuel pumps.

One proposed solution to the problem is exemplified in the U.S. Pat. to Roberts, No. 3,977,367 dated Aug. 31, 1976 wherein a single housing contains two valve-controlled passages feeding fuel to a single nozzle. Similarly, a German Offenlegungsschrift No.1,914,742, dated Oct. 1, 1970 and French Patent No. 441,788, dated Aug. 16, 1912 disclose fuel injectors having separate valve-controlled fuel supply passages. In a U.S. Pat. No. 3,339,848 to Geiger is disclosed an injector having two pressure responsive valves for controlling fuel flow to separate nozzles. This latter injector is unsuitable for use in a Wankel-type rotary internal combustion engine because it would have to be recessed back from the trochoidal housing surface an undesirable distance. In addition, the nozzles are positioned relative to each other such that neither of the nozzles could be made to communicate with a fuel passage having an ignition means therein. This latter shortcoming of the Geiger apparatus applies equally as well to the injectors disclosed in the aforesaid French Patent and the German Offenlegungsschrift.

Accordingly, it is an object of this invention to provide a stratified charge fuel system for a rotary internal combustion engine which is relatively simple and yet has increased efficiency.

Is another object of the present invention to provide a stratified charge fuel system for a rotary internal combustion engine in which a pilot and main fuel injection is achieved from a single injector and single source of pressurized fuel.

A still further object of this invention is to provide a fuel injector which is suitable for use in a rotary internal combustion engine of the Wankel type and capable of providing, from a single pressurized fuel source, an initial ejection of pilot fuel charge and a subsequent ejection of a main fuel charge.

SUMMARY OF THE INVENTION

Now, therefore, the present invention contemplates a novel fuel injector having plural discharge ports, which is suitable for use in a pilot ignited, stratified charge, rotary internal combustion engine of the Wankel type.

The fuel injector comprises a housing in which are disposed first and second movable valve parts. The first and second valve parts are telescopically arranged and are interconnected for limited reciprocative movement relative to each other. The first and second valve parts each coact with a seat in the housing to control flow of pressurized fuel respectively through a first and second nozzle means or discharge port means in the housing. The first movable valve part has a pressure surface exposed to a fuel supply chamber which receives pressurized fuel from a source thereof such as a jerk pump. The force of the pressurized fuel against the pressure surface biases the movable valve part against a force means, such as a spring, to move the first valve part away from its associated seat at a predetermined pressure value and thereby permit pressurized fuel flow through the first nozzle means. Since the first and second valve parts have a lost-motion interconnection, the first valve part unseats and, after the lost-motion is taken up, the first valve part effects the movement and unseating of the second valve part from its associated seat to thereby permit pressurized fuel flow through the second nozzle means.

The present invention also contemplates a novel pilot fuel ignited stratified charge fuel system for an internal combustion engine of the Wankel type utilizing the novel fuel injector herein described or any suitable injector capable of discharging pressurized fuel from a single source thereof through two separate nozzles in times sequence, as for example, the Pintaux fuel nozzle injector manufactured and sold by CAV, Ltd., a Lucus Company of P.O. Box 36, Warplo Way, London, England, W 37 SS.

In this combination, the Wankel-type engine has a bore in the housing for receiving and supporting a fuel injector having, as in the injector of ths invention, a first and second nozzle means through which pressurized fuel from a single source thereof is sequentially controlled by movable first and second valve parts. The bore in the housing communicates at one end with the housing cavity defined by the housing so that the second nozzle means of the injector substantially directly communicates with the working chambers defined by the housing and a rotor mounted for rotation in the housing cavity. A passage is provided in the housing so that one of its ends communicates with the housing cavity and the other end with the bore thereby communicating the first nozzle means of the injector with the passage. An ignition means, such as a spark plug, is supported in the housing to provide, in the passage, means for igniting fuel emitted by the first nozzle means and flowing through the passage. Thus, fuel flow from the first nozzle provides a pilot fuel charge which, when ignited, flashes into the working chambers to ignite a main fuel charge injected into the working chambers through the second nozzle means of the injector. The pilot fuel charge to insure consistent light-offs is, in the passage, a relatively rich fuel-air mixture, while the fuel charge injected into the working chambers, through the second nozzle means, results in a relatively lean fuel-air mixture in the working chamber.

BRIEF DESCRIPTION OF THE DRAWINGS

The above, and other objectives and advantages of the present invention, will appear more fully hereinafter from a consideration of the detailed description which follows when taken together with the accompanying drawings wherein the invention is illustrated by way of example and in which.

DESCRIPTION OF THE PREFERRED EMBODIMENTS

Figure 1:
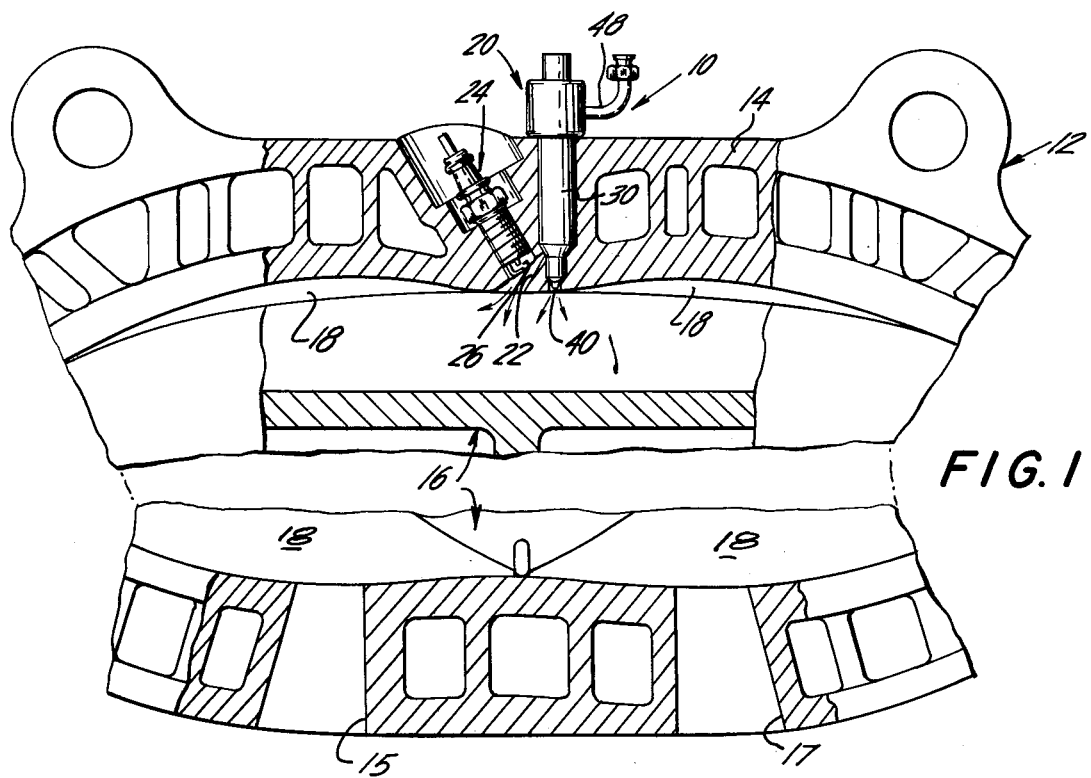
FIG. 1 is a fragmentary sectional view of a rotary internal combustion engine of the Wankel type having a pilot ignited, stratified charge fuel system and showing a fuel injector, according to this invention.

Now referring to the drawings and particularly to FIG. 1, the reference number 10 generally identifies the pilot ignited stratified charge fuel system for a rotary internal combustion engine of the Wankel type and as exemplified in the U.S. Pat. Nos. to Wankel et al, 2,988,065, dated June 13, 1961 and Bentele et al, 3,007,460, dated Nov. 7, 1961.

The Wankel-type engine 12 comprises a housing 14 which defines at least one cavity in which a rotor 16 is supported for planetary movement on an eccentric (not shown) of a mainshaft (not shown) journaled in the housing 14. The inner peripheral surface of the cavity has a trochoidal configuration and may form a multilobe cavity. The housing 14 has an inlet port 15 for the intake of air and an outlet or exhaust port 17 for the discharge of spent products of combustion. The rotor 16 is of such profile configuration, as for example generally triangular, that when disposed in a two-lobe housing cavity, it defines with the housing a plurality of working chambers 18 (only partially shown) which successively expand and contract in volumetric size as the rotor planetates within the housing cavity. In a four stroke engine, each of the working chambers 18 go through the conventional four phases of operation, namely, intake, compression, combustion or expansion and exhaust. Suitable seals (not shown) are provided to isolate each working chamber from each other and the atmosphere. To provide fuel for combustion, the pilot ignited, stratified fuel charge system 10, according to this invention, is provided.

The stratified fuel charge system basically comprises a fuel injector 20, according to this invention, disposed in the housing for discharging a "pilot" fuel charge indirectly into working chambers 18 via a passage 22 in the housing and for discharging a subsequent main fuel charge into the working chambers at a predetermined angular position of rotor 16 in housing 14. The system also provides an ignition means, as for example, a spark plug 24 so located in the housing that its spark-gap portion 26 is positioned to ignite the fuel in passage 22, the ignited "pilot" flame flashing into working chamber 18 to ignite the main fuel charge therein.

Figure 2:
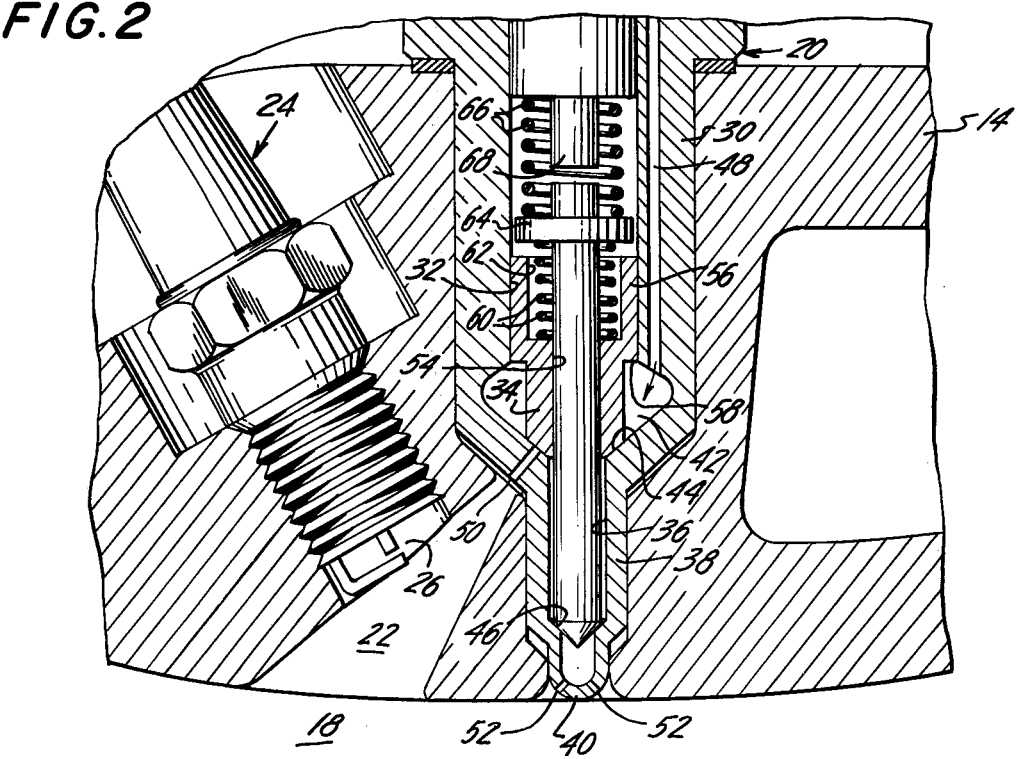
FIG. 2 is an enlarged fragmentary sectional view of the stratified fuel charge system in FIG. 1 and showing in crosssection, the construction of the fuel injector according to this invention.
Figure 3:
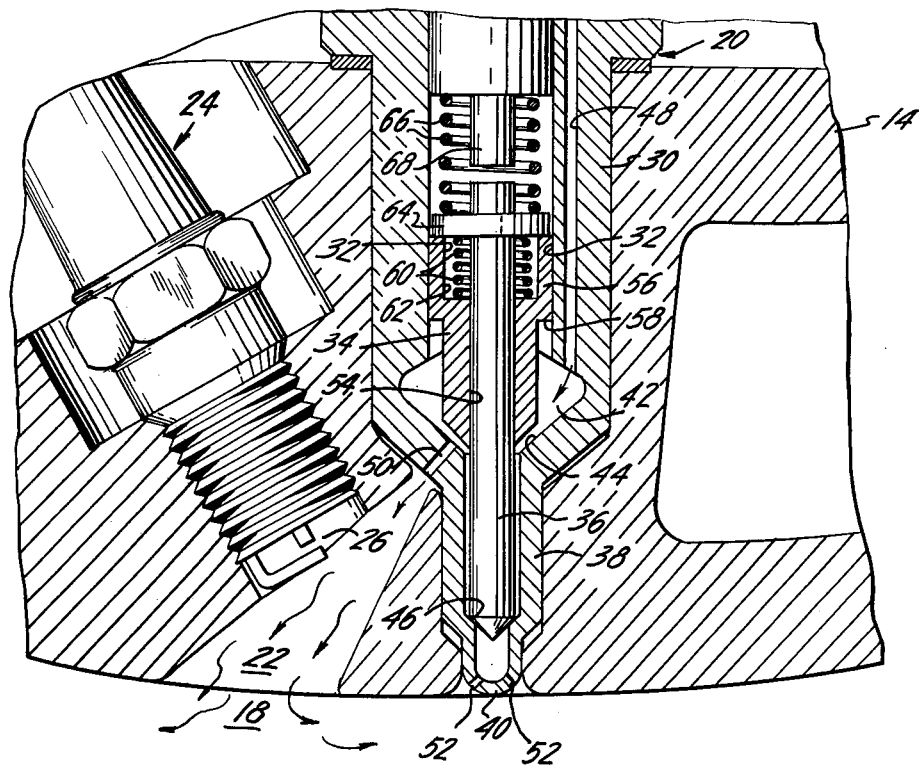
FIGS. 3 and 4 are views similar to FIG. 2 showing two other operative positions of the fuel injector shown in FIG. 2.
Figure 4:
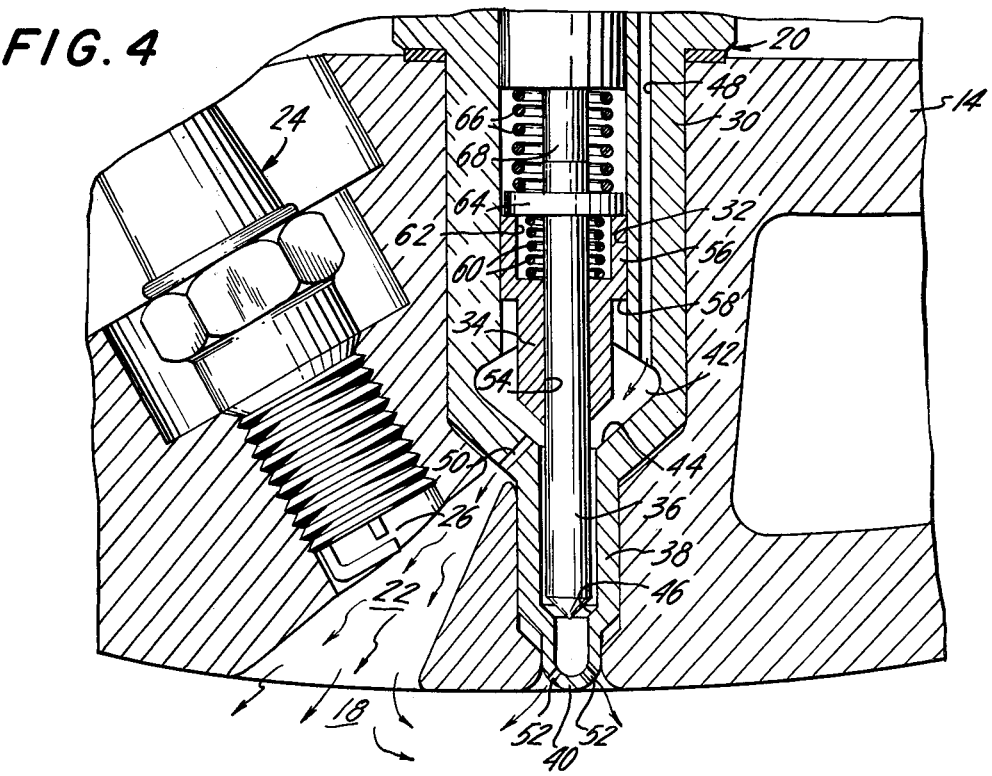

The fuel injector 20 is preferably of the construction shown in FIGS. 2 to 4, but may be of any suitable construction in which two discharge nozzle means communicate with a single source of pressurized fuel and sequentially pass such fuel therefrom. Therefore, fuel injector 20 may also be of the Pintaux type manufactured and sold by CAV, Ltd., a Lucus Company, P.O. Box 36, Warple Way, London, England W 37 SS.

The fuel injector 20 shown in FIGS. 2 to 4 comprises a barrel or housing 30 having a longitudinal bore 32 therein in which are telescopically arranged a first movable valve part 34 and a second movable valve part 36. The housing 30 has a reduced diameter portion 38 terminating in a closed tip portion 40. Adjacent the reduced diameter portion 38, the bore 32 is enlarged to provide a pressurized fuel supply chamber 42. The internal surface of bore 32 is formed at supply chamber 42 to provide a first valve seat 44 against which valve part 34 abuts. The internal surface of bore 32 is also formed adjacent tip portion 40 to provide a second valve seat 46 against which valve part 36 abuts. A supply passage 48 extends through the wall of housing 30 to communicate at one end with a source of pressurized fuel, such as a jerk-type pump (not shown) and, at the other end, with supply chamber 42 to conduct pressurized fuel to the latter intermittently and in proper timed relation to the angular position of rotor 16 (see FIG. 1). The barrel, at valve seat 44, is provided with a first nozzle means 50 which may be one or more openings communicating supply chamber 42 with passage 22 when valve part 34 is unseated. A second nozzle means 52, comprising one or more ports, is provided in tip 40 of the barrel for communicating bore 32 with working chambers 18 so as to emit fuel into the latter when valve part 36 unseats from second valve seat 46.

The first movable valve part 34 has a central bore 54 in which movable valve part 36 is slidably receivable. Also, valve part 34 has an enlarged diameter portion 56 which forms an annular surface 58 which is exposed to the pressure of the fuel in supply chamber 42. The pressure acting against surface 58 exerts a force against valve part 34 in a direction to unseat or open valve part 34. A spring 60 is provided in an axial recess 62 in valve part 34, which spring is confined between the bottom of the recess and an annular enlarged portion 64 of valve part 36. The spring 60 functions to permit valve part 34 to unseat from seat 44 at a predetermined fuel pressure level or value in supply chamber 42.

To provide for sequential movement of valve parts 34 and 36, the valve parts are so dimensioned that when each is seated against their respective seats 44 and 46, annular enlarged portion 64 of valve part 36 is spaced from the end of valve part 34. This spacing provides for axial movement of valve part 34 without movement of valve part 36 to thus effect opening or unseating of valve part 34 before axial movement and opening or unseating of valve part 36 is effected. The axial movement or lift of valve parts 34 and 36 may be limited by a spring 66 and control rod 68, as is disclosed in the U.S. Pat. to Miyake et al, No. 3,830,433, dated Aug. 20, 1974 so that the extent of lift of valve parts 34 and 36 is controlled in accordance with engine speed and load.

In operation of fuel injector 20, when fuel pressure delivered to supply chamber 42, via supply passage 48, from a pressurized source, such as a conventional jerk pump, reaches a value so that the force exerted by the fuel against surface 58 is sufficient to overcome the force of spring 60, valve part 34 is moved axially and lifted from its seat 44 as is shown in FIG. 3. The tendency for a drop in pressure in supply chamber 42 when valve part 34 unseats is offset by an increase in the surface area subject to the fuel pressure and in the pressure of the fuel flowing from the jerk pump so that valve port 34 continues to move in the unseating direction. With continued axial movement of valve part 34 under increasing fuel pressure as delivered to supply chamber 42 by the jerk pump, valve part 34 abuts enlarged portion 64 of valve part 36 and axially moves valve part 64 to lift it from its seat 46 as is shown in FIG. 4. This timed hydraulic operation of valve parts 34 and 36 provides sequential emission of fuel through first nozzle means 50 and second nozzle means 52.

In the operation of the pilot-ignited stratified fuel system 10 utilizing the fuel injector 20, the opening or unseating of valve part 34 permits pressurized fuel to discharge into passage 22 (see FIG. 2). At the proper time an electrical arc jumps the spark gap portion 26 of spark plug 24 to ignite the relatively rich fuel-air mixture in passage 22. As shown in FIG. 4, at a slightly delayed time, valve part 36 opens or unseats to permit, via second nozzle means 52, direct injection of fuel into a working chamber 18 which is a relatively large space and, therefore, provides in the working chamber a relatively lean fuel-air mixture. This lean fuel-air mixture is then ignited by the burning fuel flashing into working chamber 18 from passage 22. Of course, as is well known in the art, the timing of the operation of fuel injector 20 and spark plug 24 is coordinated with the rotation of rotor 16 (shown only in FIG. 1).

It is believed now readily apparent that the present invention provides a pilot-ignited stratified fuel system and fuel injector therefor which is relatively simple and yet effects low emissions and fuel consumption. It is a fuel system for a Wankel-type engine wherein "pilot" fuel and main fuel injection can be achieved with a single injector and a single source of pressurized fuel.

Although but one embodiment of the invention has been illustrated and described in detail, it is to be expressly understood that the invention is not limited thereto. Various changes can be made in the arrangement of parts without departure from the spirit and scope of the invention as the same will now be understood by those skilled in the art.

What is claimed is:

1. A pilot-ignited stratified charge rotary internal combustion engine comprising:
   (a) housing having a cavity therein;
   (b) a rotor supported for planetary rotation within the cavity and defining with the housing a plurality of working chambers which successively expand and contract in volumetric size as the rotor and housing rotate relative to each other;
   (c) an inlet port and an exhaust port for respectively passing at least air into the working chambers and gaseous products of combustion from the working chambers;
   (d) a fuel injector having spaced first and second nozzle means and sequentially operable valves for controlling fuel flow therethrough;
   (e) said injector being connected to a source of pressurized fuel so that fuel flows through each nozzle means when said valves are operable to an open position;
   (f) a passage in said housing for communicating said first nozzle means with the working chambers;
   (g) an opening in said housing for communicating said second nozzle means with the working chambers so that fuel is substantially directly emitted into the working chamber when its associated valve opens; and
   (h) ignition means in the passage to ignite the fuel-air mixture therein so that the burning fuel passing from the passage into the working chamber ignites the fuel-air mixture in the working chamber.

2. The apparatus of claim 1 wherein said valves are telescopically arragned for limited relative movement.

3. The apparatus of claim 1 wherein said valves are interconnected through a lost-motion connection to effect sequential opening of the valves.

4. The apparatus of claim 1 wherein said injector has a casing and said first and second nozzle means are longitudinally spaced from each other in the casing and with said second nozzle means located at one of the distal ends of the casing.

5. In a rotary internal combustion engine comprising a housing having a cavity therein and a rotor supported for planetary rotation within the cavity and defining with the housing a plurality of working chambers each of which successively expand and contract in volumetric size as the rotor and housing rotate relative to each other, the housing being provided with an inlet port and an exhaust port for respectively passing at least air into the working chambers and gaseous products of combustion from the working chambers, a pilot fuel-ignited stratified charge system comprising:
   (a) a fuel injector having
      (a-1) supply means connected to a signle source of pressurized fuel to receive fuel from the latter;
      (a-2) first and second nozzle means;
      (a-3) first and second valve parts coacting with said first and second nozzle means for sequentially controlling flow of fuel through said first and second nozzle means;
   (b) the fuel injector being supported in said engine housing with the second nozzle means positioned to substantially directly communicate with said working chambers so that fuel is passed into the working chambers when the second valve part permits flow of fuel through the second nozzle means;
   (c) a passage in said housing adjacent said fuel injector communicating the first nozzle means with the working chambers; and
   (d) an ignition means disposed in said passage to ignite the fuel-air mixture passing therein when said first valve part permits flow of fuel through the first nozzle means, the ignited fuel-air mixture flashing into the working chamber and igniting the fuel air mixture therein.

6. The apparatus of claim 5 wherein said first and second movable valve parts are telescopically arranged with respect to each other and slidable relative to each other.

7. The apparatus of claim 6 wherein lost-motion means is provided to interconnect the first and second valves so that the first valve part is operable to an open position before the second valve part is actuated to an open position.

* * * * *